W. WHITELEY.
Plow Moldboard.
No. 78,501.
3 Sheets—Sheet 1.
Patented June 2, 1868.
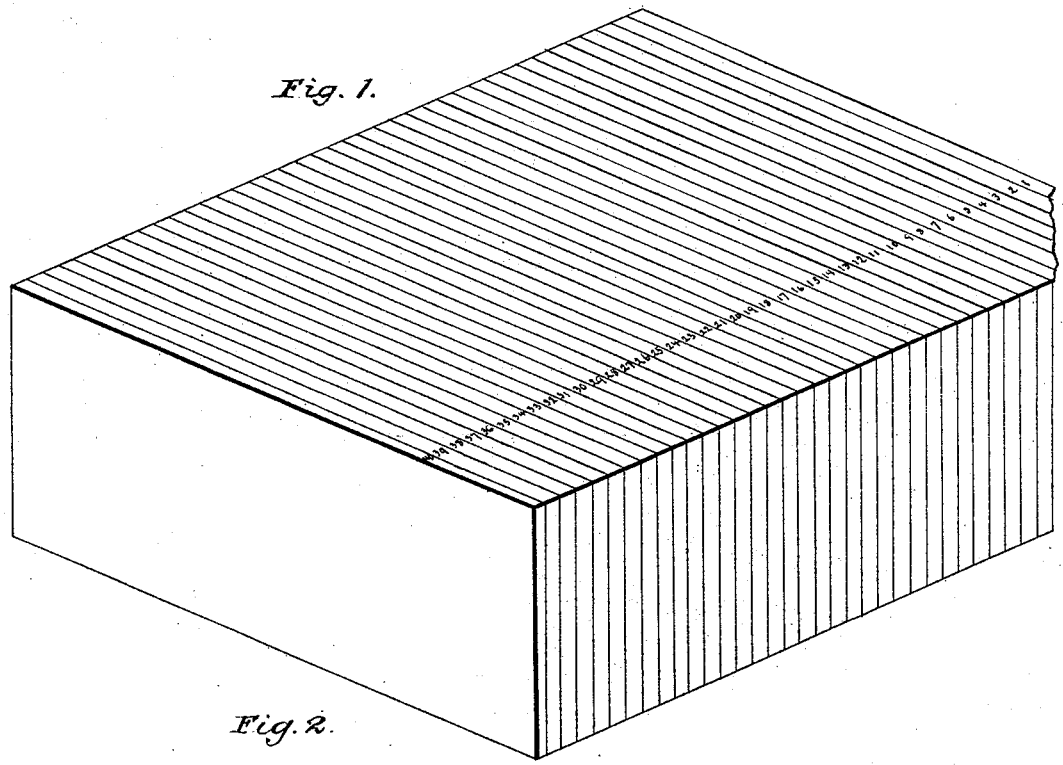
Fig. 1.
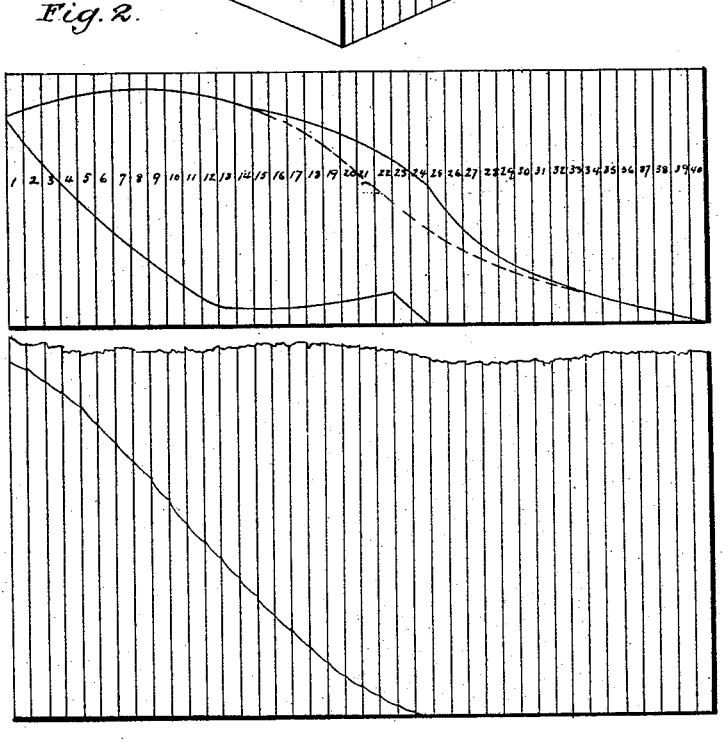
Fig. 2.
Fig. 3.
Witnesses.
Inventor.

W. WHITELEY.

Plow Moldboard.

No. 78,501.

Patented June 2, 1868.

W. WHITELEY.
Plow Moldboard.

Patented June 2, 1868.

Witnesses

Inventor.
William Whiteley

United States Patent Office.

WILLIAM WHITELEY, OF SPRINGFIELD, OHIO.

Letters Patent No. 78,501, dated June 2, 1868.

IMPROVEMENT IN PLOUGHS.

The Schedule referred to in these Letters Patent and making part of the same.

TO ALL WHOM IT MAY CONCERN:

Be it known that I, WILLIAM WHITELEY, of Springfield, in the county of Clark, and State of Ohio, have invented certain new and useful Improvements in Ploughs; and I do hereby declare the following to be a full, clear, and exact description of the same, reference being had to the accompanying drawings, in which—

Figure 1 is a perspective view of the block, upon the face of which I describe the shape of my plough mould-board.

Figure 2 is an elevation of the end or land-side plane of said block.

Figure 3 is a top plan of same.

Figure 4:
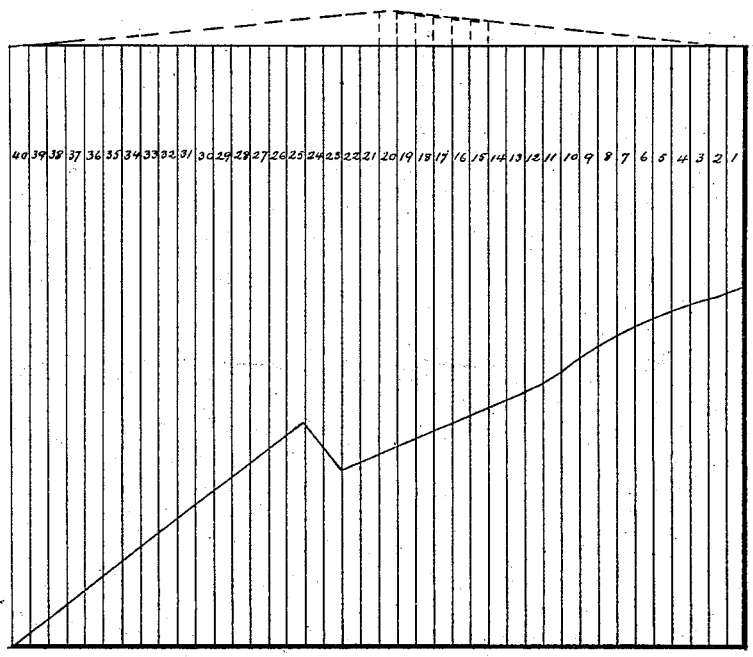
Figure 4 is a bottom plan of same.

In ploughing, especially in sod-land, it is desirable to turn the sod, so as to lay the furrow uniformly, and to produce, by the turning, a great number of minute fractures upon the earth-side of the furrow-slice; said fractures being evenly distributed, opening as the furrow-slice rises, and closing again as it falls inverted. These fractures are produced by the elongation of the furrow-slice while being inverted, and they are of the greatest importance, as producing the desirable condition of mellowness in the soil, which greatly facilitates the subsequent processes of cultivation, and produces rapid disintegration of the tougher portions which formed the original surface.

My invention consists, first, in a system of construction to produce a plough-shape or mould-board of such form as will secure these desirable conditions of the soil; and, second, in certain improvements in the details of construction of the plough, which will fully appear in the appended description and claims.

The curvature of the furrow-slice, while being turned, is of a peculiar character. Rising from a flat surface, one edge is turned up, curved convexly, and is again deposited inverted, and in a line parallel with but measurably at one side of its former position. The surface, from being plane, becomes curved and again plane. The furrow-slice, during this, represents a spiral section of a warped cylinder. From the commencement of its rise to the commencement of its fall, all its arcs in vertical planes are arcs of equal circles, but arranged relatively to each other in conformity to a definite system, which is herein laid down. It is evident that a furrow-slice cannot be thus raised and inverted without more or less disturbance of its particles, especially upon the earth or convex side, which is therefore much fractured, and the process of disintegration is successfully commenced. In forming the mould-board of a plough, it is required that the furrow-slice should be raised and inverted with, first, the least possible amount of friction, and, second, the most uniform distribution of friction over the surface of said board, because, in ploughing, it is first necessary to do the work in the most effectual manner, and, second, to accomplish it with the least expenditure of force. My experiments have demonstrated that, to do the work in the most effectual manner, to wit, to secure the most uniform and minute fracture of each side of the furrow-slice, the mould-board must conform to the natural curvature of the furrow-slice or tough sod while being inverted, and that this form will also secure the least amount of friction. A proper length for the mould-board from extreme point to point is formed to equal twice the width of the furrow, plus twice the depth of the same; and, as the plough herein represented is designed to cut a furrow-slice fifteen inches in width and eight inches in depth, it follows that the length of the mould-board should be $15+15+8+8=46$ inches, and these dimensions may be taken as the standard upon which all future calculations may be based, though it is evident that said dimensions may be slightly varied without materially changing the result, and without departing from the spirit of my invention. The formula herein given will enable a skilled mechanic to produce upon the face of a suitable block or tablet the exact configuration of surface desired, without regard to the arbitrary outlines or edges of the plough mould-board. When the block has been reduced to the proper shape and form, the outlines indicating the edges of the mould-board may be traced upon it, and the actual and complete form may be produced, these outlines always being in a great degree arbitrary and matters of taste. The shape now presented represents the face or mould-board of my plough in reverse, that is, it is the former or die which will impart the proper curvature to a plastic sheet pressed against it. In practice, it is, of course, necessary that this mould should be reproduced in metal, by casting or otherwise. The shape herein described includes that portion called the share, as well as the mould-board proper, the division of mould-board and share being in a great measure arbitrary, and a matter of convenience.

What I mean by the word "curve," when used in the following formula, is the direction of the line which indicates the edge of the mould-board in relation to a horizontal plane, and by the word "departure," I mean to indicate the direction of the same line in relation to a vertical plane coincident with the surface of the land-side. I use the term "furrow-slice" to indicate a plane upon which the plough may be standing, and which, when the plough is in operation, is coincident with the bottom of the furrow. In the following formula it refers to those edges of the sections which are downward, and are all made true and in line with each other; and, by "land-side plane," I refer to a plane perpendicular to the furrow-plane, and which, when the plough is in operation, is coincident with the land-side cut.

By the term "block," I refer to the combination of sections, upon one face of which the mould-board shape is formed. By the term "shape," I mean the general twist or curvature of the face of the mould-board without reference to the arbitrary outlines of the same.

A plough, cutting a furrow of fifteen inches in width and eight inches in depth, and with a length of forty-six inches, being taken as a standard, I will describe the method of producing the proper shape for a mould-board of that size, and will afterwards describe a method by which a corresponding figure either larger or smaller may be produced, and also a method by which this form may be varied for certain purposes.

I procure forty pieces of pine, or other suitable wood, each exactly one inch in thickness after being planed smooth, and with parallel sides, about three feet in length and fourteen inches in width. These pieces, I place upon edge, and clamp them fast and securely together. One edge and both end surfaces are then dressed true and smooth, and accurately, at right angles to each other. When this has been done, I have a compound block with one side and both ends true, and at right angles to each other, as shown in fig. 1. The width of the various sections of which this "block" is composed is not material; it is only required that they should be a little wider than the dimensions laid down in the first of the following tables. The "block" is now to be placed upon a plane surface; the true side downward, represents the plane or bottom surface of the furrow, while one of the "true" ends represents the vertical plane of the land-side cut. From these planes, the various measurements are now to be taken, which will eventuate in the production of the desired shape. Fig. 1 represents the land-side plane, and fig. 3 the furrow-plane. For convenience, I number the sections from 1 to 40, commencing at the left-hand section, when facing the land-side plane, fig. 1. All measurements are to be made and marked on the joint between two sections, so as to be equally indicated on each of the adjoining sections.

I will now give the series of measurements, which will indicate the height of the "curve" of the upper edge of the mould-board above the furrow-plane. This height is arbitrary, but the measurements given will secure the desired object. Commencing with the outer or left-hand side of section 1, fig. 1, the first measurement is 12''; section 2, $12\frac{1}{4}''$; section 3, $12\frac{1}{2}''$; section 4, $12\frac{11}{16}''$; section 5, $12\frac{14}{16}''$; section 6, $13\frac{1}{16}''$; section 7, $13\frac{1}{4}''$; section 8, $13\frac{3}{8}''$; section 9, $13\frac{1}{2}''$; section 10, $13\frac{5}{8}''$; section 11, $13\frac{3}{4}''$; section 12, $13\frac{5}{8}''$; section 13, $12\frac{7}{8}''$; section 14, $12\frac{5}{8}''$; section 15, $12\frac{3}{8}''$; section 16, 12''; section 17, $11\frac{1}{2}''$; section 18, $10\frac{7}{8}''$; section 19, $10\frac{1}{4}''$; section 20, $9\frac{1}{2}''$; section 21, $8\frac{1}{16}''$; section 22, 8''; section 23, 7''; section 24, $6\frac{1}{4}''$; section 25, $5\frac{1}{2}''$; section 26, $4\frac{3}{4}''$; section 27, $4\frac{1}{4}''$; section 28, $3\frac{13}{16}''$; section 29, $3\frac{1}{2}''$; section 30, $3\frac{1}{8}''$; section 31, $2\frac{5}{8}''$; section 32, $2\frac{1}{4}''$; section 33, 2''; section 34, $1\frac{3}{4}''$; section 35, $1\frac{1}{4}''$; section 36, $1\frac{1}{4}''$; section 37, 1''; section 38, $\frac{3}{4}''$; section 39, $\frac{1}{2}''$; section 40, $\frac{1}{4}''$; and thence to 0'' at the right-hand edge of section 40.

If the points so marked are now joined by a continuous curved line cutting through all of them, we shall have the outline in elevation of a plough mould-board of sufficient height to turn the sod. This figure, it will be seen, is indicated in fig. 2.

After having indicated the curve of the mould-board, I next proceed to measure inward from the land-side plane the distances to indicate the "departure" of said board, and, commencing as at first with the outer or left-hand surface of section 1, I measure and mark 20''; section 2, $19\frac{5}{8}''$; section 3, $18\frac{7}{8}''$; section 4, $18\frac{1}{4}''$; section 5, $17\frac{1}{2}''$; section 6, $16\frac{1}{2}''$; section 7, $15\frac{1}{2}''$; section 8, $14\frac{1}{2}''$; section 9, $13\frac{1}{4}''$; section 10, $12\frac{1}{4}''$; section 11, 11''; section 12, $9\frac{7}{8}''$; section 13, $8\frac{7}{8}''$; section 14, $7\frac{3}{4}''$; section 15, $6\frac{5}{8}''$; section 16, $5\frac{3}{4}''$; section 17, 5''; section 18, $4\frac{1}{4}''$; section 19, $3\frac{3}{4}''$; section 20, $3\frac{1}{8}''$; section 21, $2\frac{5}{8}''$; section 22, $2\frac{1}{4}''$; section 23, 2''; section 24, $1\frac{3}{4}''$; section 25, $1\frac{1}{2}''$; section 26, $1\frac{1}{4}''$; section 27, $1\frac{1}{8}''$; section 28, 1''; section 29, $\frac{7}{8}''$; section 30, $\frac{3}{4}''$; section 31, $\frac{21}{32}''$; section 32, $\frac{18}{32}''$; section 34, $\frac{12}{32}''$; section 35, $\frac{5}{16}''$; section 36, $\frac{1}{4}''$; section 37, $\frac{3}{16}''$; section 38, $\frac{1}{8}''$; section 39, $\frac{1}{16}''$; section 40, $\frac{1}{32}''$; and 0'' at right-hand outer face of section 40. The measurements above indicated are shown in fig. 3.

I next turn my "block" over, so as to expose the furrow-plane surface, and commencing, as before, with the outer face of section 1, I measure in from the land-side plane, and mark $19\frac{1}{4}''$; section 2, $18\frac{3}{4}''$; section 3, $18\frac{1}{2}''$; section 4, $18\frac{1}{4}''$; section 5, $17\frac{3}{4}''$; section 6, $17\frac{1}{2}''$; section 7, 17''; section 8, $16\frac{5}{8}''$; section 9, 16''; section 10, $15\frac{5}{8}''$; section 11, $14\frac{5}{8}''$; section 12, 14''; section 13, $13\frac{1}{2}''$; section 14, 13''; section 15, $12\frac{1}{2}''$; section 16, $12\frac{1}{4}''$; section 17, $12''$; section 18, $12''$; section 19, $12''$; section 20, $12''$; section 21, $12''$; section 22, $12''$; section 23, $12''$; section 24, $12''$; section 25, $12''$; section 26, $12''$; section 27, $11\frac{2}{15}''$; section 28, $10\frac{4}{15}''$; section 29, $9\frac{6}{15}''$; section 30, $8\frac{8}{15}''$; section 31, $7\frac{10}{15}''$; section 32, $6\frac{12}{15}''$; section 33, $5\frac{14}{15}''$; section 34, $5\frac{1}{15}''$; section 35, $4\frac{3}{15}''$; section 36, $3\frac{5}{15}''$; section 37, $3\frac{7}{15}''$; section 38, $2\frac{9}{15}''$; section 39, $1\frac{11}{15}''$; section 40, $1\frac{3}{15}''$; and $0''$ at outer surface of section 40.

Having now marked the distances of "curve" and "departure," I unclamp my sections and separate them. I find upon each edge of each section the mark indicating the "curve" and "departure," as above stated. It is next necessary to draw a line indicating the vertical curvature at the joint between each of the adjoining sections. This vertical curvature is the arc of a circle, whose radius may be greater or less, according to the nature of the work for which the plough is specially intended, as will be hereafter more fully explained, and in the drawings this radius is $18''$.

Figure 5:
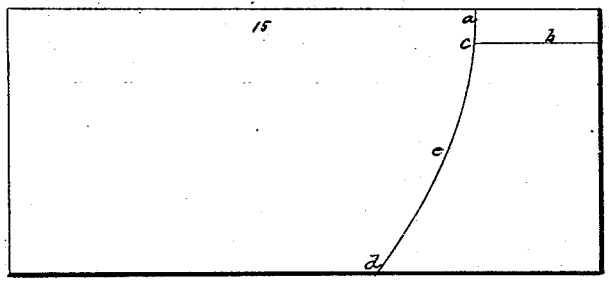
Figure 5 is a side elevation of one of the sections of this block detached.

As a matter of convenience, I cut the segment of this circle in the edge of a piece of thin wood or metal, and use the scroll thus formed as a guide for my pencil or scribing-point to lay said arc upon each side of each of said sections. To do this, however, I have first to find the point which indicates both "curve" and "departure," on the side of each section, and this is easily accomplished by the use of a try-square, the lines $a\,b$, fig. 5, being drawn at right angles to the land-side and furrow-planes, and from the "curve" and "departure" marks on the edges of the sections. The point, $c$, where the lines $a\,b$ intersect is the point which indicates both "curve" and "departure," and through which the edge of the mould-board will actually cut.

All of these measurements may be made and indicated upon the sections while they are separate and apart from each other, but I consider that it will require much more care and trouble than when the method above described is pursued.

The point $c$ having been indicated upon each side of each section, I lay the scroll which I have prepared (described above) upon the side of the section, so that the curved edge will exactly cut through the point $c$ and through the point $d$, which marks the departure upon the furrow-plane, and with a sharp pencil or scribing-point I trace the arc $e$ of the proper circle to indicate the vertical curvature of the mould-board.

This arc I project above the point $c$ for some distance, usually to the extreme upper edge of the section. It is evident now that I have the exact shape of my mould-board marked upon the sections at intervals of only $1''$. I now proceed to cut away the land-side end of each section accurately down to the arc $e$, leaving the centre portions of the sections slightly protuberant, as shown in fig. 3. This being done, the sections all replaced in their proper positions, side by side, (the outer ends being true, have only to be brought to a straight edge,) and again clamped solidly together, the end surface then presents the mould-board curvature roughly blocked out, and needing but the hand of a careful workman to dress it down exactly to the lines marked on each section, and it will then present, finished, the proper and efficient mould-board shape which I have invented.

The outlines of the edge of the mould-board, and the divisions between it and the share, are in a great measure arbitrary, and if the "curve," "departure," and vertical form of the mould-board, are in accordance with the principles above indicated, I should regard the implement as being constructed after my method, notwithstanding its outward appearance might be very different from mine.

The red line in fig. 2 indicates the edge of the furrow-slice, as it is raised up and turned over by the mould-board, and so far as the purposes of turning the sod only are concerned, if the top edge of the mould-board reaches to that line, or nearly so, (until the upper edge of the sod has passed a point vertical to the lower edge,) it would be effective, but, practically, a little more is needed, and I therefore continue the face of the mould-board upward above the edge of the sod, during the space from the 16th to the 35th sections, inclusive. The effect of this extension is, it carries the mould-board upward until it cuts the land-side plane, and thus forms a sharp edge and junction with the land-side plates, and it also extends upward far enough at its central portion to join firmly to the post at about the 20th section.

The practical advantages of this extension are, first, the increased strength of the parts, and, second, the complete inversion and burial under the sod of such loose stuff as manure, &c., which may be lying upon the ground, and without the possibility of any lodgment or clogging between the land-side plates and the front edge of the mould-board.

When the upper edge of the sod has reached the 16th section, or thereabouts, it has so far been raised toward the perpendicular that it may be safely permitted to pass over the mould-board, its continued curving movement being insured by the increasing inclination or departure of the mould-board still further toward section 1.

In practice, I have adopted a line for the upper edge of my mould-board, as given in the first table of curve from section 1 to section 16; thence to a point on the land-side plane, about $2\frac{1}{4}''$ higher than the "curve" on section 25; thence on the land-side plane to the point of the share at section 40. On the furrow-plane a line is drawn straight from section 40 (outer face) to a point on the junction between sections 24 and 25, and this line marks the edge of the share, and its terminus at sections 24 and 25 the heel of the same. From this heel-point I draw a line at about right angles to the edge of the share, and continue it from said heel across sections 24 and 23; thence I continue it about parallel with the edge of the share to the junction of sections 13 and 14, and thence about direct to the top line at section 1. These lines, as before stated, are mostly arbitrary. It is only required that the heel of the share should be $15''$ from the land-side plane, on a line perpendicular to said plane.

It may be found desirable to vary the form of the mould-board, to adapt it to particular purposes or soils; for instance, the curvature that is best adapted to the turning of sod may not produce the best results when used on land which has been cultivated, but the variations which may be required cannot be designated here, because they would be modified in a greater or less degree for every variation in the soil. I can, however, describe the method by which any desired variation in form may be secured.

Figure 6:
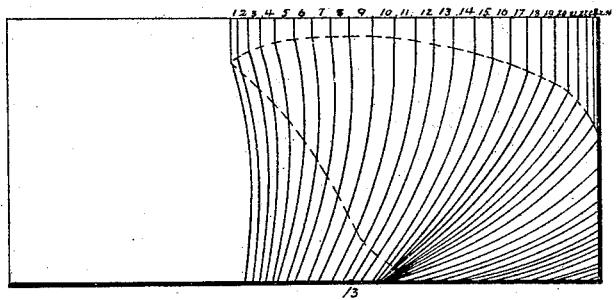
Figure 6 is a side elevation of the block after the plough shape has been worked out.

For example, if it is desired to make the mould-board $\frac{1}{2}''$ fuller in the centre, move section 20 back $\frac{1}{2}''$, and then strike lines from its rear or outer end to the rear ends of sections 1 and 40, and then move the intermediate sections back until their rear ends touch the said lines. When the face of the mould-board is now dressed true in conformity to this change of position, it will present a face with $\frac{1}{2}''$ less curvature than before. This change of position is illustrated in fig. 6.

Or, if it is desired to give the rear point of the mould-board $1''$ more departure than is herein laid down, then draw section 1 back $1''$, and draw, as before, a line from its rear end to the rear end of section 40, and set the intermediate sections back to said line, and then smoothing the face down true as before.

If it is desired to lengthen the mould-board, it may be done by adding sections at the left-hand side of the block, setting off the proper departure upon the extreme left-hand section, and diminish the departure of sections 1 to 40 in proportion to the number of added sections.

Changes in the height or curve of the mould-board may be made according to taste, no special rules being necessary.

The vertical curvature of the face of the mould-board may be varied by using the arc of a greater or less circle to connect the points; and Having now fully set forth the principles upon which the operation of my plough depends, and a good method of carrying those principles into practical operation, I will proceed to describe the mechanical structure of my plough.

The die or former upon which the mould-board, when of wrought metal, is shaped, is constructed of metal, and is duplicated, of the form above described.

The plough herein represented is a left-hand plough, and it will appear evident that, to produce a right-hand plough, it will only be necessary to arrange the sections in the opposite order, i. e., place section 1 where section 40 now is, and carrying the operation throughout in the reverse direction.

It will also be evident that to enlarge or diminish this form it will only be necessary to use a larger or smaller scale.

Figure 11:
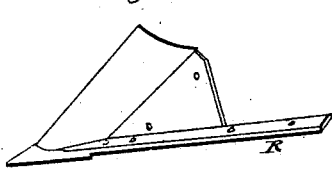
Figure 11 is a perspective view of my ploughshare detached, showing its construction.

A is the mould-board of my plough, made of sheet steel, heated and bent to the proper form upon the face of an iron die or former, which is shaped in accordance with the principles herein laid down. The part which is actually termed the mould-board does not extend down to the edge of the share, but, for convenience of manufacture and repair, it terminates at the line g, drawn from the under-cut angle, at sections 22 and 23, forward, about parallel with the cutting-edge of the share, to the land-side. The share B is also made of sheet steel, and its form is shown in fig. 11. One edge is welded to the wrought-iron land-side bar R, and it is secured to the framework of the plough by bolts. Being constructed in the manner shown, it becomes cheap and durable. It may be removed with facility for repairs, and it may be sharpened and stretched by heating and hammering, to compensate for the loss incident to use.

The post C, to which the mould-board, share, and land-side plates are secured, and by which they are attached to the beam D, is made of cast iron, with a triangular cross-section, and open on the rear side, so as to require the least quantity of metal in its construction, and be accessible for the purpose of attaching and securing the various parts at its inner side. At the lower end, the post C curves outward on the mould-board side, so as to conform to the shape of said mould-board at those points where they come opposite to each other. On the land-side face of said post it is perpendicular and straight, and fitted to receive the land-side plates, which are bolted to it upon that side. At the top of said post is a flat projecting flange, I, to give a broad, secure seat to the plough-beam D; and on the front side or edge of the post is a projecting lug, F, beneath which the clamping-stirrup G is placed, to bind the post and plough-beam together. The rear projection of the flange E is provided with two notches, H H, and a stop-pin, I, rests in one of said notches, and is inserted tightly in a hole in the plough-beam, so as to be immovable. This is for the purpose of shifting the post C, in its position under the beam D, a little to one side or to the other, as may be required, to adapt the line of draught to use two or three horses abreast to draw the plough.

Through the top of the post C, and in line with the plough-beam, beneath the flange E and stud F, is an orifice, rectangular in form, and extending entirely through the post, which is here closed on the rear side. A wrought-iron bolt, J, properly fitted, is inserted through this orifice, and a head at its rear end prevents it from being drawn entirely through. To the front end of this bolt J, the draught-rod K, to which the team is attached, is secured, but in such a manner as will permit said draught-rod to be entirely detached. The bolt J passes in close contact with the lower side of the lug F, and the stirrup G is placed beneath the said bolt, so as to draw it upward against the lug F, when its screw-nuts are tightened up.

By this arrangement I am enabled to secure my post-head to the plough-beam, by the use of a stirrup, without weakening said beam by perforating it with bolt-holes, and without liability of fracturing that part of the post-head embraced by said stirrup, because the clamping force is applied to the wrought-iron bolt J, which is tough, and capable of withstanding sudden and severe strains; and the cast-iron lug F serves only as an intermediate support, keeping the bolt J and plough-beam D at the proper distance asunder, but not sustaining any strain except that of direct compression, which it is perfectly able to resist.

At the front end of the plough-beam is a horizontal clevis-plate, L, by means of which the line of the draught-rod may be adjusted toward one side or the other, as may be desired or found to be necessary. The same is also adjustable vertically, by placing upon the eye-bolt M a number of disks or washers, N, some above and some below the clevis L, the number below determining the degree of elevation of the end of the plough-beam as the line of the draught-rod K may be considered as a permanent line, always leading to the same point, i. e., the point of attachment with the team.

By this arrangement I secure the strain of draught directly upon that portion of the plough most proper to receive it, that is, the post C; and the plough-beam is not required to sustain any of this strain, but only to act as a lever in directing the movements of the plough and securing uniformity of its operation. The plough-beam being thus relieved from a great portion of the labor usually imposed upon it, and not being weakened by being perforated in the region of the post-head, as is usually done, it is evident that a much lighter beam may be employed with safety and efficiency.

The stirrup G may be made from a square wrought-iron bar, bent in proper form to pass upward on each side of the plough-beam, and with a horizontal space at the lower part of the bend, as at $h$, to permit the bolt J and the post C to be moved sideways to adjust the plough, as above mentioned, for use with two or three horses, as may be desired.

Figure 9:
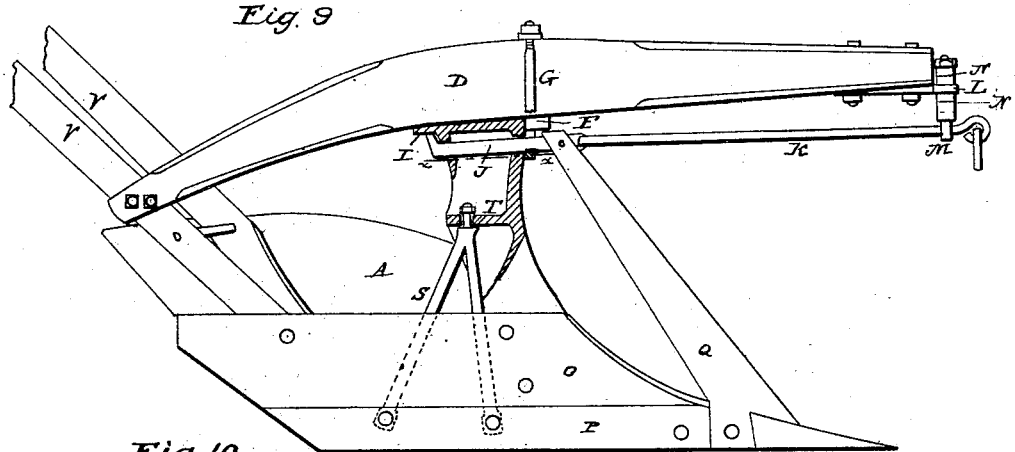
Figure 9 is a land-side elevation of same, some portion being in vertical section.
Figure 10:
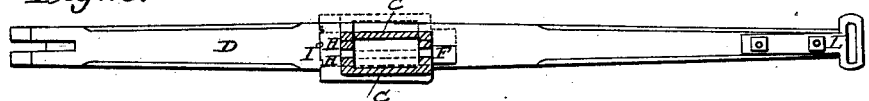
Figure 10 is a bottom plan of plough-beam, the plough-post being shown in horizontal section on line $x\ x$ in fig. 9.

I prefer to construct my plough with plates bolted upon the land-side bar R, so that the same may be renewed as worn out. The mould-board, at its land-side edge, extends far enough past the post C to cover the ends of the land-side plates, shown at O and P, fig. 9, so as to present but a single edge forward, and no joint exposed, for the admission of dirt, &c., during the operation of ploughing.

Figure 7:
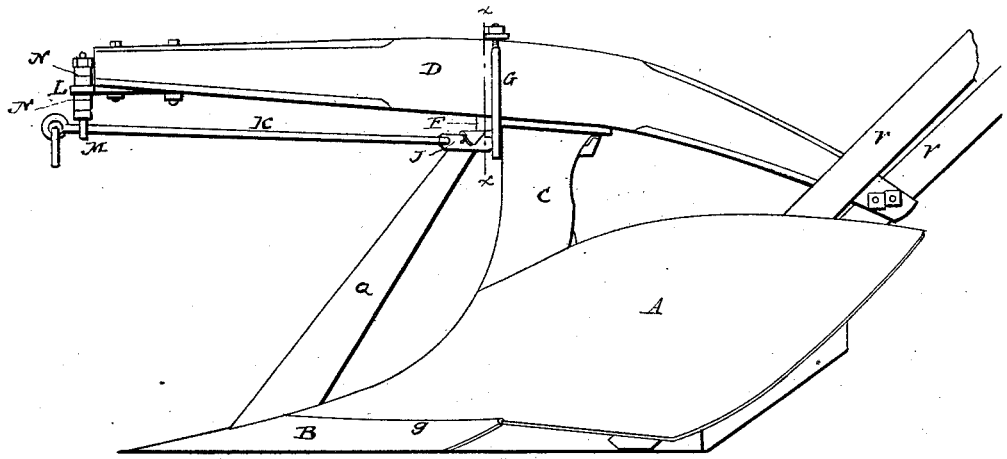
Figure 7 is a side elevation of my plough complete.
Figure 8:
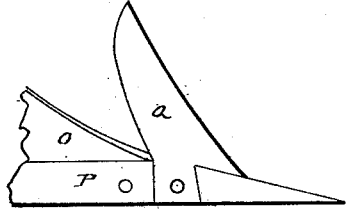
Figure 8 is a side elevation of a portion, the same showing the short coulter.
Figure 12:
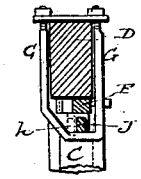
Figure 12 is a vertical cross-section of plough-beam, showing the form of the stirrup which clamps the post to the beam on line $x\ x$, fig. 7.

On the land-side surface of the share and land-side bar I make a recess, for the reception of the lower end of the coulter Q, which must be flush, on the land-side face, with the land-side plates O and P. Said end is secured to the land-side bar by a screw-bolt, and the upper end may be secured to the bolt J, as shown in fig. 7; or a short coulter, secured only at its lower end, may be used and preferred by some, such as is shown in fig. 8. The split brace S may be used to strengthen the connection of the post C and land-side bar. Said brace has it head secured, by a screw-nut, to the ledge T, which is cast in the post just below the bolt J, and its lower ends are bolted to the land-side bar R. The plough-handles U U are secured in the usual manner, by bolts, &c., to the plough-beam and mould-board.

Having described my invention, what I claim as new, and desire to secure by Letters Patent, is—

1. The construction and use of ploughs, when the shapes of those parts which cut and invert the furrow-slice are determined and obtained by the herein-described rule, substantially as set forth.

2. The method of obtaining modified forms of the plough-shape, substantially as herein described.

3. In combination with the draught-bolt J, the stirrup G or its equivalent, which surrounds both bolt and beam, and binds them firmly together without perforating or otherwise weakening said beam.

4. In combination with the post to which the mould-board is connected, the bolt J or its equivalent, for the purpose of connecting the draught-rod at a rigid point in front of the plough-post.

5. In combination with the post C and beam D, the notched flange E, for the purpose of shifting the position of the said beam in relation to the post C, so that a team of two or three horses may be used at pleasure.

6. In combination with the clevis L or its equivalent, the eye-bolt M and washers N, substantially as and for the purpose set forth.

7. In combination with the front projection at the top of the plough-post and the land-side of the share, the coulter Q or its equivalent, secured to said projection or its equivalent, in front of the clamping-stirrup, in order to equalize the upward pressure, substantially as set forth.

8. The brace S, in combination with the post C and stirrup G, substantially as and for the purpose set forth.

9. The stirrup G, constructed with the horizontal portion $h$, to enable the beam to be adjusted sideways, as described, and for the purpose set forth.

10. The share B, constructed with the land-side bar R, substantially in the manner shown.

WILLIAM WHITELEY.

Witnesses:
   Geo. Mower,
   J. Kreider Mower.